INVENTOR.
THOMAS G. POLANYI
IRWIN TOBIAS
BY
ATTORNEY

United States Patent Office 3,453,557
Patented July 1, 1969

3,453,557
LASER STABILIZATION APPARATUS
Thomas G. Polanyi, Croton-on-Hudson, N.Y., and Irwin Tobias, New York, N.Y., assignors to Laser Incorporated, a corporation of New York
Filed Mar. 15, 1965, Ser. No. 439,527
Int. Cl. H01s 3/05, 3/10, 3/22
U.S. Cl. 331—94.5                    11 Claims

ABSTRACT OF THE DISCLOSURE

A frequency stabilized gas laser consisting of a laser device having first and second end reflectors, a fixed axial magnetic field surrounding the laser device for splitting the resulting stimulated emission into right and left circularly polarized light, a detector for producing a rectified D.C. voltage proportional to the difference in intensity between the right and left circularly polarized stimulated emission, and means for moving the first reflector in response to the voltage output from the detector.

---

This invention relates generally to laser apparatus and more particularly to laser apparatus useful with a laser device for spacing the end reflectors thereof to stabilize the frequencies of oscillation at or in a known relationship to the center of the atomic transition at which the laser action occurs.

Objects, features, and embodiments of the present invention will be described in detail in the following paragraphs, with reference to the accompanying drawings, wherein.

Figure 7:
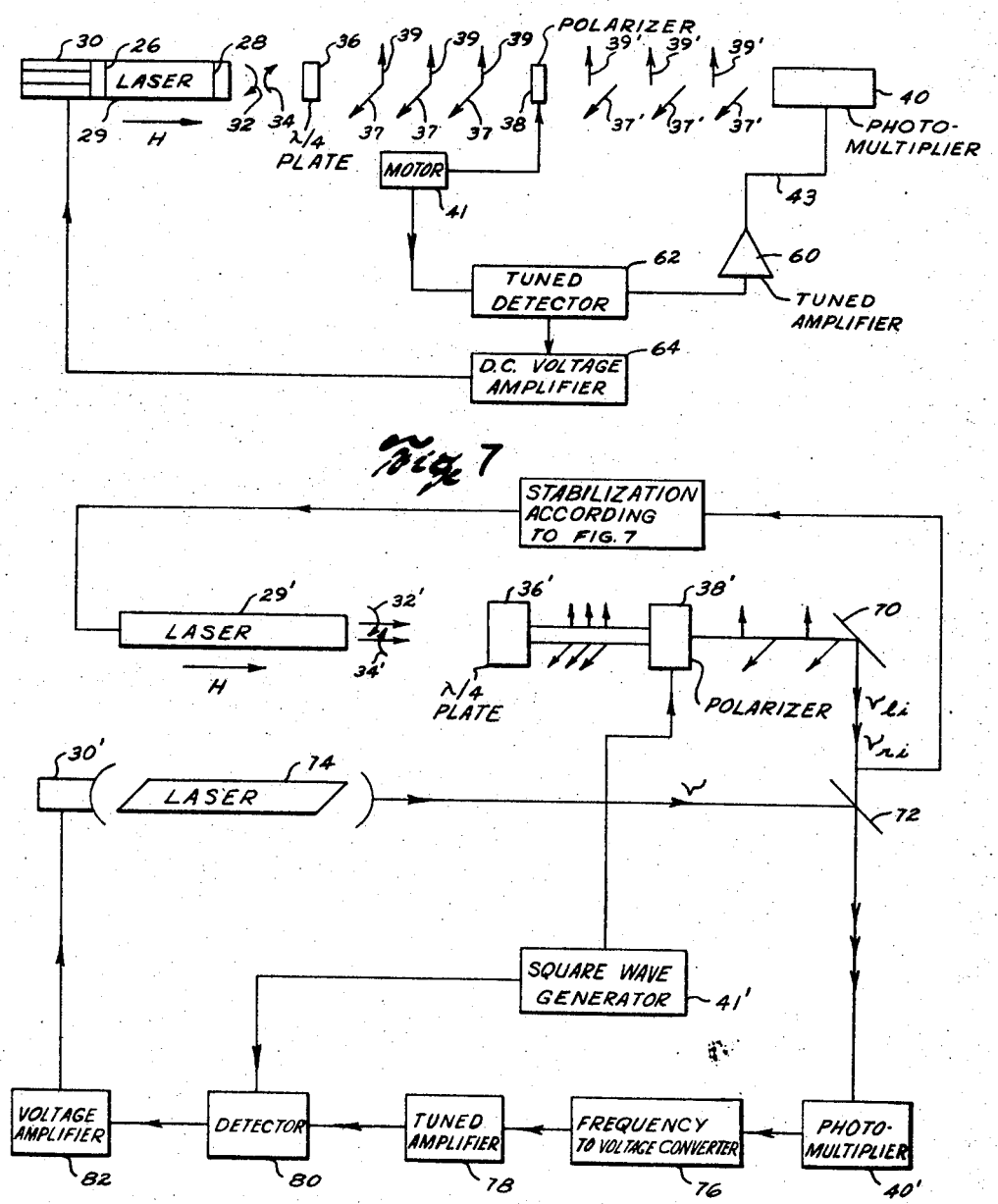
FIG. 7 is a diagrammatic representation of an apparatus according to the present invention for operating symmetrically about line center (center of atomic transition at which laser action occurs) and at line center or a known distance from it.

FIGS. 8(a)–8(g) are various plots illustrating the intensity of radiation at various stages in the apparatus for FIG. 7;

FIG. 9 is a diagrammatic representation of an alternative embodiment of the present invention for operating rigorously at line center; and, FIGS. 10(a)–10(e) are various plots of power versus frequency for operation according to the apparatus of FIG. 9.

The frequency of oscillation of a laser (an acronym for Light Amplification by Stimulated Emission of Radiations) is determined by the spacings of the end reflectors or mirrors serving as the boundaries of a resonant cavity. The laser will oscillate at any frequency for which the gain of the medium in said cavity is sufficient to overcome losses and the optical path, i.e., the geometrical path multiplied by the index of refraction, is equal to an integral number of half-wavelengths. The theoretical value, experimentally confirmed, of the line width of laser radiation is of the order of a few cycles per second or less. Depending upon the particular characteristics of the active medium and upon the resonant cavity losses, the frequency of oscillation of the laser may assume values differing by as much as the full width of the Doppler-broadened transition at which laser action occurs. The Doppler width is inversely proportional to the wavelength of the transition and depends upon other factors such as the mass of the atom and gas temperature. In typical cases of interest, e.g., the 6328 A. line of the He-Ne gas laser, this width is approximately 1500 mc./sec. It may be much more in other important lasers such as the ion lasers. It is apparent, therefore, that a laser can operate over a wide range of output frequencies. It is difficult to preset the operating frequency of a laser oscillator to a desired value and to restrict the excursions of the operating frequency, since it is difficult to establish *the mirror* spacing with the required precision and to maintain this spacing thereafter. For a typical gas laser oscillator having a nominal mirror spacing of 50 cm. and operating at 6328 A., a variation of mirror spacing of $0.3\mu$ causes a frequency displacement of 300 mc./s. If one wishes to keep the frequency of the oscillator to within 1 mc./sec. it becomes necessary to control the mirror spacing to 2 parts in $10^9$ or approximately to within 10 angstroms. It is quite apparent that, as stated above, the spacing of the reflectors cannot be preset to such close tolerances, and that at any setting of the mirrors, the maintenance of the spacing is a difficult task, since acoustic vibrations and thermal effects will affect it in a major way. However, to realize to the fullest extent one of the most important potentialities of a gas laser oscillator, i.e., the extreme monochromaticity of its radiation, it is necessary to control the frequency of operation and to reduce to as small a value as possible the frequency excursions of the oscillator. Increased frequency stability of a gas laser is important for many applications involving the accurate measurements of distances, velocities and frequencies. Examples of such applications are the measurements of lengths in metrology, of velocities of moving particles in radar or in scattering experiments, and the heterodyne detection of a signal requiring a fixed local oscillator. While in many applications a stable oscillator is sufficient, the usefulness of the oscillator is increased if in addition to being stable, it operates at a known frequency: it then becomes a frequency standard. The need to stabilize the frequency of a gas laser to an intrinsic characteristic of the atomic system, thus making the oscillator frequency independent of a mechanical quantity such as the mirror spacing, was recognized at an early date. Considerable efforts have been made to stabilize the frequency of the laser to the center of the atomic transition at which the laser action occurs. Previous proposals of methods to stabilize the frequency of a gas laser to the center of the transition, of which we are aware, have not proved to be entirely satisfactory.

Figure 1:
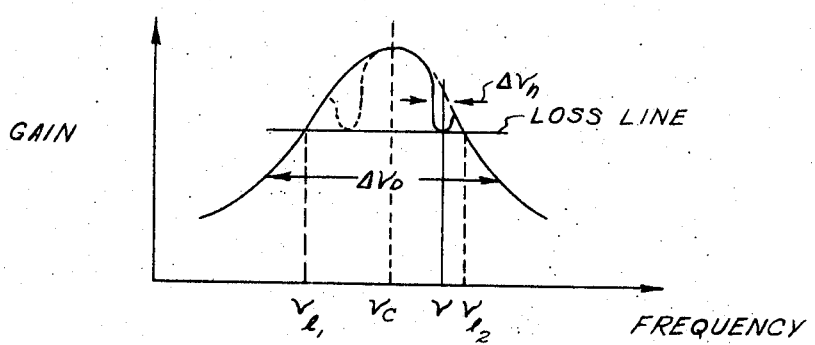
FIG. 1 is a plot of gain of the laser medium versus frequency illustrating the phenomenon of "hole burning" or selected depletions in population distribution of the atoms of the medium.

Several of such stabilization methods are based on the phenomenon of "hole burning." This can be understood by reference to FIG. 1. The curve represents the gain of the medium versus frequency. The center of the transition is at $\nu_c$; the width of the Doppler broadened gain curve at half-width is denoted with $\Delta\nu_D$; oscillation can occur at any frequency for which the gain is higher than the losses, i.e., $\nu_{e_1} < \nu_c < \nu_{e_2}$; the actual frequency of oscillation is determined by the condition $$\nu = \frac{mc}{2Ln(\nu)} \qquad (1)$$

where $m$ is an integer, $c$ the velocity of light, $L$ the mirror spacing and $n(\nu)$ the index of refraction of the medium at frequency $\nu$. If a single mode oscillates at frequency $\nu$, it corresponds, in the first approximation, to a plane wave moving, say, from right to left in the resonator, then reversing direction at the mirror and moving from left to right. The electric field corresponding to this plane wave can stimulate radiation of those atoms which oscillates within a narrow frequency range of width $\Delta \nu_n$ centered at $\nu$, the quantity $\Delta \nu_n$ being the natural line width. The electric field grows until it is sufficiently strong to reduce the population inversion at $\nu$ to the point where the gain no longer exceeds the loss within the system. Thus a "hole" may be said to be "burned" in the gain distribution curve. The half width of this hole is of the order of the natural line width. The Doppler broadened distribution curve arises from the fact that the atoms are moving about with a Maxwellian velocity distribution and that to the natural frequency centered at $\nu$ there are added or subtracted by Doppler effect the frequencies $v/c$ or $$-\frac{v}{c}$$

where $v$ is the thermal velocity of the atoms which follow a Maxwellian distribution. If a wave of frequency $\nu$ traveling from left to right interacts with atoms moving towards it with velocity $v$, when the wave changes direction it will interact again with atoms moving toward it, hence having velocities $-v$; these atoms are located on the distribution curve symmetrically with respect to the center $\nu_C$ of the gain curve. As a consequence a second hole is burned in the gain distribution. This is indicated with the dotted "hole" in FIG. 1. This second hole is generally called the "mirror hole."

Figure 2:
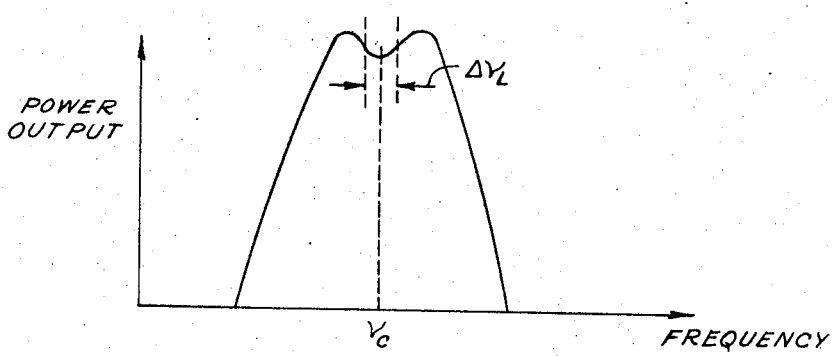
FIG. 2 is a plot of power output versus frequency showing the "Lamb dip" phenomenon or the coalescence of the "holes" of FIG. 1 at the frequency of the center of the transition.

If the frequency of operation $\nu$ approaches $\nu_C$, the hole at $\nu$ and its image coalesce and the gain distribution curve has the appearance indicated in FIG. 2. It can be seen from FIG. 2 that the power output of the laser has a minimum when the laser oscillates at the line center. The dip in the power output curve at the center is called the "Lamb dip"; it has a characteristic width of about 20 mc./sec. for the 6328 A. transition in neon (Ne). It is apparent that this power dip can be sensed by electronic means and a signal thus derived utilized to reset the mirror spacing by electrical means such as by use of magnetostrictive or piezoelectric elements controlling the spacing between reflectors. This method of stabilization was described by K. Shimoda, in paper 2–1, Conference on Precision Electromagnetic Measurements, June 23, 1964, Boulder, Colo. In order to obtain a signal indicating the direction of detuning, the mirrors are oscillated back and forth to obtain the minimum of the power vs. length function. The second derivative of power vs. length is used to set the power level and the third derivative to obtain a signal indicating the sense of the correction. The oscillation of the mirrors introduces frequency modulation in the signal which in many cases may be undesirable. Stabilizations to 1 part in $10^9$ were reported, but the system is obviously very complex, due to the electronic circuitry necessary. Furthermore, this method requires frequency modulation of the laser and a modulated output is undesirable for many applications.

The frequency of oscillation of the laser is determined by the formula:

$$\nu = \frac{mc}{2Ln(\nu)}$$

Figure 3:
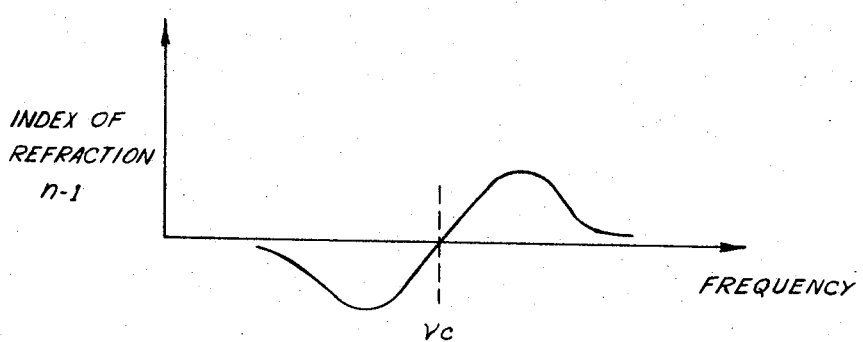
FIG. 3 is a plot of index of refraction versus frequency in the usual shape of an anomalous dispersion curve.

The dominant factor is the length $L$ since $n(\nu)$ is very close to one. Nevertheless, frequency shifts of several hundreds of kilocycles are due to small deviations of the index of refraction $n$ from unity in the neighborhood of line center. The behavior of the index of refraction $n$ as a function of frequency is shown in FIG. 3 in the usual shape of an anomalous dispersion curve. The major contribution to the variable part of the index of refraction is the behavior of the atomic polarizability at the lasing transition. Other transitions in the gas and particularly transitions in helium (He), or generally any buffer gas, have an almost constant contribution to the index of refraction over the frequency range of interest since the lasing transition is far away from other resonances. Another generally constant contribution to the index of refraction is due to free electrons present in the gas discharge. When lasing occurs the gain curve is distorted owing to hole burning. As a consequence of the distortion of the gain curve, the index of refraction is slightly modified. The net effect of these perturbations is to increase the frequency of oscillation of a mode if its frequency of oscillation is larger than $\nu_C$ or to decrease its frequency of oscillation if it is smaller than $\nu_C$. With reference to FIG. 1 one can say that the holes burned in the distribution curve repel each other. An important aspect of this change in index of refraction is that it is power dependent as is apparent if one realizes that as the distortion of the gain and index of refraction curves become larger, the power output of the laser oscillator becomes higher. A stabilization scheme based upon the power dependent frequency shift of a laser has been operated by W. R. Bennett, Jr. et al. (Applied Physics Letters, vol. 5, No. 3, p. 56, August 1964). This stabilization scheme requires that the frequency of the laser to be stabilized be compared with the frequency of a second laser; the gain of the first laser is modulated thus modulating its power output and consequently the beat frequency relative to the second laser. The beat frequency variation goes to zero and changes phase with respect to the power modulation when the frequency of the first laser goes through the center of the line. Stabilization of a laser to one part in $10^{10}$ has been achieved with this method on the $3.39\mu$ transition of the He-Ne laser. Disadvantages of this method are that a very high gain laser transition is required, that the laser which is stabilized to the line center is amplitude modulated, that for the system to be effective the second laser must be stable with respect to the first one and its frequency of oscillation offset by a known amount.

Figure 4:
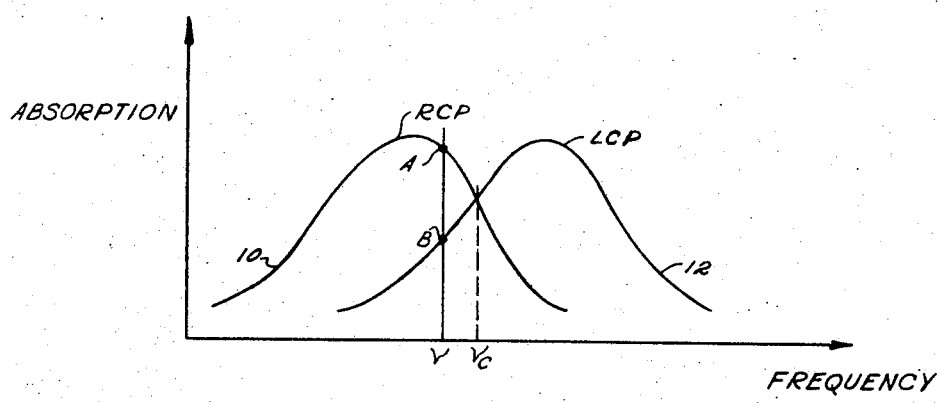
FIG. 4 is a plot of absorption versus frequency for left and right circularly polarized light obtained by Zeeman splitting in a magnetic field.

Another stabilization method was described by A. D. White et al. (Applied Physics Letters, vol. 5, No. 5, p. 97, Sept. 1, 1964). In this method the laser beam is made to traverse an absorption cell containing the same transition which originates the laser beam. The absorption cell is immersed in a longitudinal magnetic field which splits the atomic absorption line into two curves, one for left, the other for right, circularly polarized light (Zeeman effect). As shown in FIG. 4, the absorption curves split symmetrically with respect to line center $\nu_C$. If the laser oscillation at frequency $\nu$ is right circularly polarized (RCP), it will be absorbed, according to curve 10, by an amount proportional to A. If the laser oscillation is left circularly polarized (LCP), it will be absorbed, according to curve 12, by an amount proportional to B. The absorption of RCP and LCP light will be equal only if the laser oscillates at the line center. In one version of the stabilization method based on this phenomenon, the plane polarized radiation of the laser is made alternatively right and left circularly polarized (both at the same frequency) by means of an electro-optic $\lambda/4$ (quarter-wave) switch. The difference in absorption can be detected as an electrical signal at the switching frequency. The amplitude of such a signal is proportional to the distance of the laser oscillation frequency from line center and the polarity of the signal reverses when the laser frequency traverses line center. It is apparent, therefore, that a synchronous detector can furnish a signal which can be used to adjust the mirror spacing by some electrical means. The authors have reported successful stabilization of a laser to approximately one part in $10^9$. This stabilization scheme avoids certain objectionable features of other systems mentioned earlier such as frequency or amplitude modulation of the stabilized laser. One definite shortcoming of the scheme is lack of sensitivity since the absorption of the medium is relatively low and small differences in absorption provide the stabilization signal. This stabilization method is also complex in that it requires an additional gas absorption cell and associated electronic equipment.

Several stabilization methods have also been described in the literature which utilize symmetry properties of lasers oscillating simultaneously in several modes (see United States Patent No. 3,170,122, Frequency Stabilized Optical Maser by W. R. Bennett, Jr., issued Feb. 16, 1965), or the shape of the output power curve. These methods, while feasible, have not led to stabilizations comparable to the ones described above. Other methods are based on the response of an external cavity (see Ballik, Physics Letters, vol. 4, No. 3, Apr. 1, 1963); results obtained with these also do not compare favorably with the methods described above.

Accordingly, a primary object of the present invention is to provide frequency stabilization apparatus for a laser device which does not require the modulation of any laser characteristic in order to obtain an error signal.

A further object is to provide a simple stabilization apparatus with a high sensitivity.

These and other objects are accomplished in one illustrative embodiment of the present invention wherein there is provided apparatus useful with a laser device to stabilize its frequency to the center or to a known relation with the center of the atomic transition at which laser action occurs. Such apparatus includes a laser device having internal mirrors being immersed in a magnetic field, so that the radiation output consists of right and left circularly polarized emission. A quarter wave plate transforms the radiation into mutually perpendicular plane polarized waves and a polarizer rotated by a motor separates the phase of the plane polarized components. The components impinge on a photomultiplier, which has an output of the sum of two sinusoidally varying intensities out of phase by 90°. These signals are amplified by an amplifier, which is tuned to the frequency equal to the periodicity of the combined intensity curves, the rectified output of which is a D.C. voltage proportional to the difference in intensity between the right and left circularly polarized radiation. The voltage is detected, amplified and coupled to a piezoelectric transducer to move one of the laser mirrors.

Figure 5:
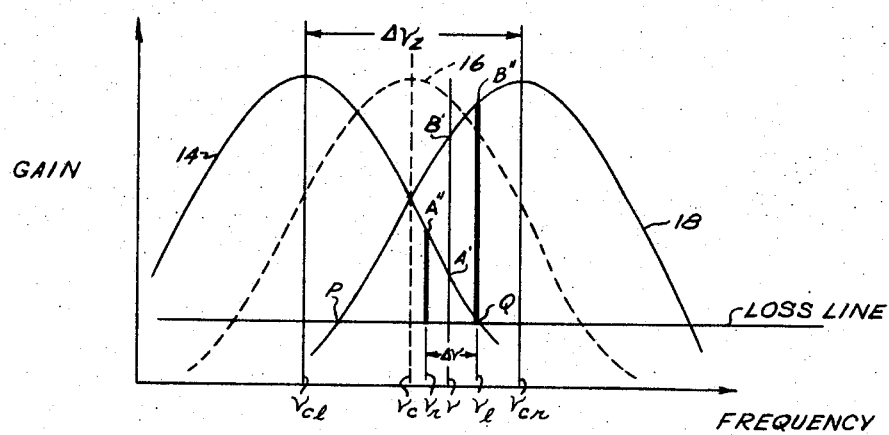
FIG. 5 is a plot of gain versus frequency for left and right circularly polarized light, the splitting of the gain curve being obtained by immersing the laser in a magnetic field, i.e., Zeeman effect.
Figure 6:
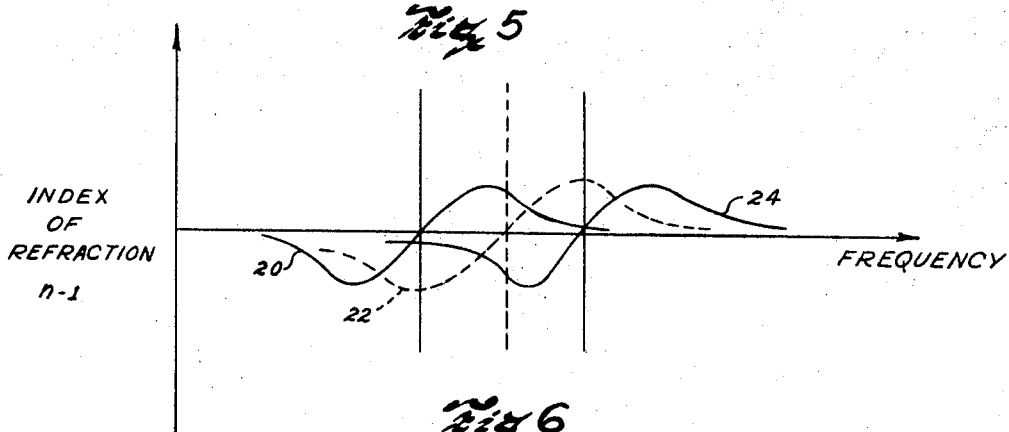
FIG. 6 is a plot of index of refraction versus frequency for left and right circularly polarized light.

The present invention can be described in more detail as a stabilization apparatus including the following: a single mode laser operated in an axial magnetic field, whose gain curve is split by the magnetic field into two curves which are symmetrical with respect to the unsplit gain curve, which exists in absence of the magnetic field (as shown in FIG. 5); the two curves are symmetrical with respect to the line center $\nu_C$. The two gain curves correspond to right and left circularly polarized transitions. The presence of the magnetic field has the effect of introducing circular birefringence in the medium. The amount of splitting of the two gain distributions is a function of the magnetic field and can be calculated by means of the theory of the Zeeman effect. In addition to the introduction of circular birefringence the magnetic field also introduces circular dichroism in the medium, i.e., the gains for right and left circularly polarized light at the same frequency are different. This is illustrated in FIGS. 5 and 6. In FIG. 5, curve 16 is the unperturbed gain curve with its center at $\nu_C$, and curves 14 and 18 are the RCP and LCP distributions respectively (intensities are normalized to one). The index of refraction curves for the three distributions are shown in FIG. 6, and are labeled 20 for the RCP, 22 for the unperturbed and 24 for the LCP distributions. Since the condition of oscillation is $\nu = mc/2Ln(\nu)$, it is seen that one obtains two different frequencies from this formula when one substitutes for $n(\nu)$, $n^+(\nu)$ or $n^-(\nu)$, respectively, where $n^+$ and $n^-$ are the indices of refraction for the two polarizations. The amount of splitting is given by $$\Delta\nu = \nu_e - \nu_r = \frac{mc}{2Ln^-(\nu_e)} - \frac{mc}{2Ln^+(\nu_r)} = \frac{mc}{2L}\left(\frac{1}{n^-(\nu_e)} - \frac{1}{n^+(\nu_r)}\right)$$

To a sufficient degree of approximation one can also write, $$\Delta\nu = \frac{mc}{2L}[n^+(\nu) - n^-(\nu)]$$

where $\nu$ is the unperturbed frequency.

As seen above, after application of an axial magnetic field the laser originally oscillating in one mode, now oscillates in two closely spaced modes, one RCP, the other LCP having a frequency difference $\Delta\nu$. This radiation is equivalent to a plane polarized radiation whose plane of polarization rotates at the frequency $\Delta\nu/2$. If this radiation is detected by a photomultiplier after traversing a polarizer, the output of the photomultiplier will consist of a sine wave of frequency $\Delta\nu$ since the polarizer has a periodicity of $\pi$ radians. The existence of such a signal has been demonstrated experimentally by various workers: H. Statz, R. A. Paananen, and G. F. Koster, J. App. Phys., 33, 2319 (1962); I. Tobias and R. A. Wallace, Phys. Rev., 134, A549 (1964). The dependence of the frequency splitting $\Delta\nu$ upon the magnetic field has also been investigated quantitatively by Tobias and Wallace. It is found that for the 6328 A. transition in Ne it is approximately 1/1000 of the Zeeman splitting, $\Delta\nu_Z$, see FIG. 5. An examination of FIG. 5 shows that the intensities of the modes at frequency $\nu_e$ and $\nu_r$ into which the original mode at $\nu$ is split, are different; the intensity of the RCP is proportional to A", the one of LCP to B". It is apparent that the intensities of the two modes will be equal only if the original unsplit mode oscillates at the line center $\nu_C$. Equivalently one can state that if the intensities of the RCP and LCP modes are equal, the two modes are equidistant from line center, one below the other above.

Figure 8:
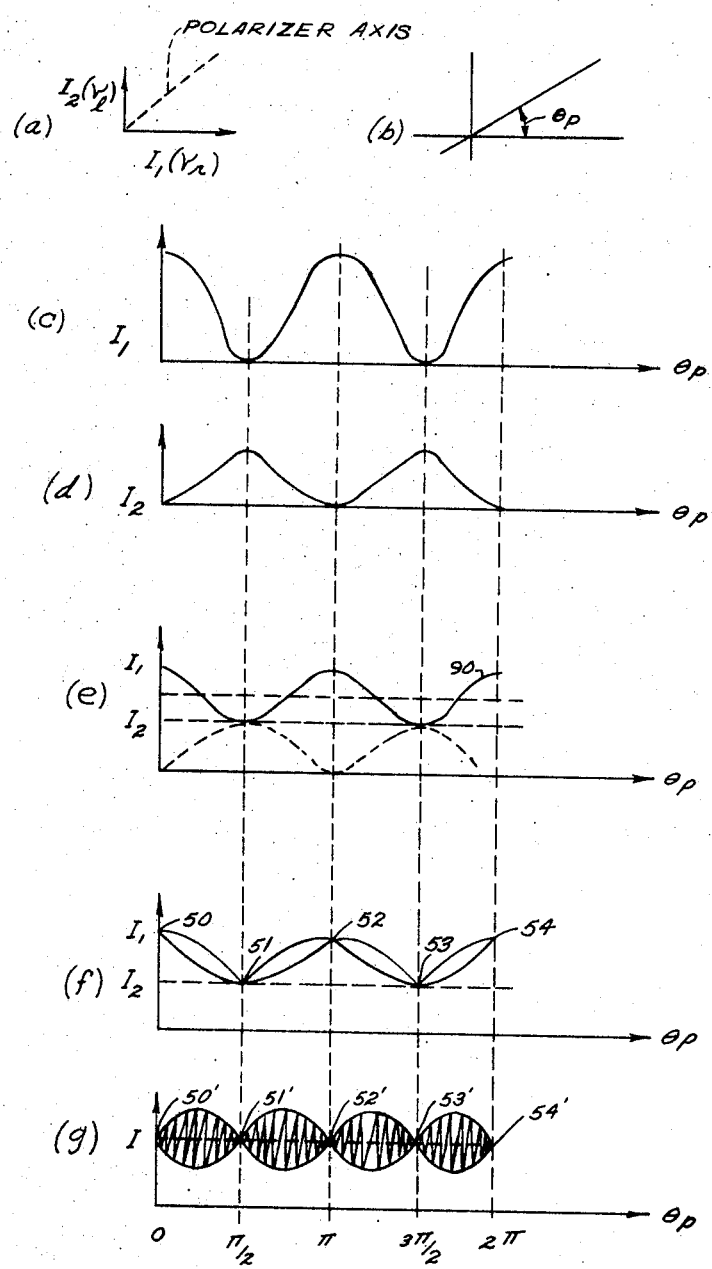

The stabilization scheme to be described in more detail below is based on the mode splitting and intensity considerations just explained. Referring to FIG. 7, laser 29 with internal mirrors 26 and 28 is shown immersed in a magnetic field H. Laser 29 is so constructed that piezoelectric transducer 30 displaces the mirror 26 parallel to itself when appropriate voltages are applied. The radiation from the laser consists of right and left circularly polarized radiation, as indicated by arrows 32 and 34. These two radiations are transformed into two mutually perpendicular plane polarized waves 37 and 39 by the quarter wave plate 36 and made to impinge upon a polarizer 38, which is rotated by a motor 41 at the angular speed $\theta_p$. The radiation 37' and 39' emerging from the polarizer 38 is detected by photomultiplier 40. Output 43 of the photomultiplier is proportional to the sum of two intensities which vary sinusoidally at the angular frequency $2\theta_p$ and are out of phase by 90°. These two intensities represent the intensities of the left and right circularly polarized radiation respectively. These signals are shown in FIG. 8. FIG. 8(a) shows the plane polarized waves which are mutually perpendicular as they emerge from quarter wave plate 36. The polarizer axis is indicated in 8(b). Light wave $I_1$ alone passing through the polarizer gives rise to the signal shown in 8(c) where the intensity of the signal recorded by the detector is shown for a rotation of the polarizer by an angle of $2\pi$ radians. Light wave $I_2$ alone gives rise to the signal shown in 8(d). The waves $I_1$ and $I_2$ together combined as shown by solid line 90 in 8(e). It will be noted that the periodicity of the signal is $2\theta_p$ and that on the drawings the average values have been retained. The points on curve 8(f) denoted 50, 52, 54 correspond to the intensity of one circularly polarized radiation, while points denoted 51 and 53 correspond to the other circular polarization. If the signal from photomultiplier 40 of FIG. 7 is passed through the amplifier 60 tuned to the frequency $2\theta_p$, the rectified output will be a D.C. voltage proportional to the difference in intensity between RCP and LCP radiation. This signal will go to zero when the intensities of these radiations are equal and change sign when the intensities of the two signals reverse. The output of detector 62 suitably amplified through amplifier 64 can be used to control piezoelectric transducer 30 to maintain the output of detector 62 at its zero value.

The signal output from the photomultiplier is actually more complex than shown in FIG. 8($f$). It will be recalled that the right and left circularly polarized radiations have slightly different frequencies and that the radiation resulting from the superposition of these two signals if passed through a polarizer gives rise to a sinusoidal signal at frequency $\Delta\nu = \nu_1 - \nu_r$. The introduction of the quarter wave plate does not eliminate this signal; this can be best understood by considering the instant at which the polarizer axis is midway between the slow and fast axes of the quarter wave plate. At this instant the two plane polarized waves at frequency $\nu_1$ and $\nu_r$ have equal components on the polarizer axis (see FIG. 8($a$)) and a signal at frequency $\Delta\nu$ is obtained. It is also seen that there are four angular positions for which the signal at $\Delta\nu$ has maximum amplitude. However, the polarizer rotates and each time the polarizer axis crosses one of the planes of polarization of the plane polarized waves $I_1(\nu_1)$ and $I_2(\nu_e)$, the intensity of this component goes to zero and the frequency $\Delta\nu$ has zero amplitude. The points where *either* one or the other of the intensities goes to zero are the points labeled 50, 51, 52, 53, 54 in diagram ($f$) of FIG. 8. At all other points there appears a modulation of frequency $\Delta\nu$, much higher than the frequency of rotation of the polarizer, superimposed on the solid sinusoid shown in ($f$) of FIG. 8. When points like 50, 52, 54 ... and 51, 53 ... become equal in intensity the total signal is as shown in diagram ($g$) of FIG. 8. The periodicity of its envelope is $4\theta_p$ as mentioned above. It should be noted that the tuned amplifier 60 of FIG. 7 is tuned to the angular frequency $2\theta_p$ of rotation of the polarizer $2\theta_p$ and is insensitive to the frequency $\Delta\nu$. The output of the detector is zero as explained above when the intensities 50', 51', 52', 53', 54' corresponding to points 50, 51, 52, 53, 54 ... are equal irrespective of the presence of the higher frequency.

The system as described provides a laser having two frequency stabilized circularly polarized outputs at frequencies $\nu_1$ and $\nu_r$ symmetrically disposed with respect to the line center $\nu_C$. The frequency separation $\Delta\nu$ between these two components is approximately one thousandth of the Zeeman splitting. For the 6238 A. transition of Ne in the He-Ne laser and for magnetic fields varying from 10 to 500 oersteds, this frequency $\Delta\nu$ varies from ~14 kc. to ~1.2 mc. A higher field would not be required. It should be noted explicitly at this point that the stabilization scheme just described is inherently incapable of correcting for variations which leave unaltered the average frequency $(\nu_1-\nu_r)/2$. Frequency variations of such a symmetric type may be caused for example by changes in the magnetic field or in the power output of the laser. However, such variations of the power output and of the magnetic field have only a small effect on the laser frequency output, of the second and third order respectively. If desired, one can regulate by feedback the power output of the laser and regulate to a higher degree the magnetic field. It should be noted also that the stabilization scheme of this invention results in a laser having two output frequencies whose average is the unperturbed frequency of line center. The two frequencies are offset or equally spaced from line center, one above, the other below. The frequency offset is a known function of the applied magnetic field, it is easily measurable and it is small, about one thousandth of the Zeeman splitting $\Delta\nu_Z$. To operate rigorously at line center, one can, according to the present invention, use a second laser as explained in the following paragraphs.

For many applications it is sufficient to have a stable frequency close to the line center and whose separation from line center is known. However, to stabilize one laser exactly to line center if one has available the two frequencies of another laser stabilized according to the FIG. 7 embodiment of the present invention, the two beat frequency differences between the other laser and each of the two modes of the one laser are obtained; when these two beat notes are equal the one laser operates rigorously at line center. One way of obtaining such a stabilization is shown in FIG. 9. Laser 29' has outputs $\nu_{l_i}$ and $\nu_{r_i}$; these are passed through a quarter wave plate 36' and an electro-optic polarizer 38' which passes alternatively first one then the other of the two frequencies. By means of mirror 70 and beam splitter 72 frequencies $\nu_{l_i}\nu$ and $\nu_{r_i}\nu$ are combined in photomultiplier 40'. The output of the photomultiplier will contain alternatively the frequency differences $\nu-\nu_{l_i}$ and $\nu-\nu_{r_i}$, where $\nu$ is the instantaneous operating frequency of laser 74. The output of the photomultiplier is fed to a frequency to voltage converter 76 which in turn is fed to tuned amplifier 78 and a detector 80. The output of the detector can control electrically (through transducer 30') the spacing of the mirrors of laser 74 through voltage amplifier 82. Further modifications of the invention include other means to obtain a signal to control laser 74. Instead of an electro-optic polarizer one can separate the two outputs by means of a quarter wave plate and a Wollaston prism and continuously compare the frequencies $\nu-\nu_{l_i}$ and $\nu-\nu_{r_i}$ by feeding the two beat notes of two independent frequencies to voltage converters and deriving an error signal from these two voltages.

If a first laser is stabilized to line center by means of the second one, any frequency changes in $\nu_{l_i}$ and $\nu_{r_i}$, which leave unaltered their average, have no effect on the stabilization to line center of the first laser.

Figure 10:
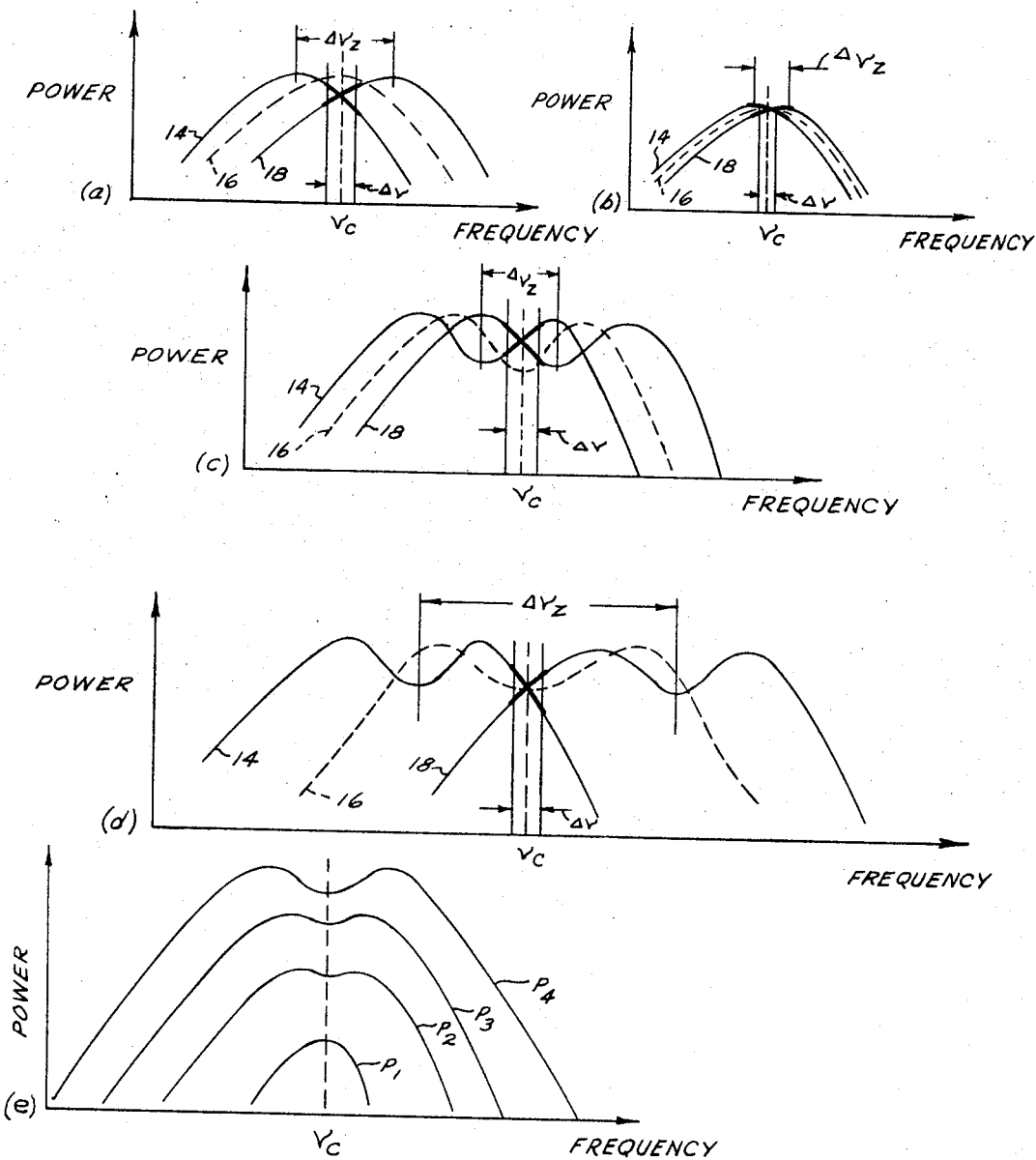

The stabilization methods described above are based on the comparison of the intensities of two closely spaced modes; this intensity difference changes as the average frequency of the two modes changes; it is zero when the average frequency is at the line center $\nu_C$ of the unperturbed distribution. Near line center, the power difference $\Delta P = p(\nu_1) - p(\nu_r)$ between the two modes is a linear function of the difference $d\nu$ between the average frequency and line center. Optimum operating conditions are obtained when the $\Delta\nu_Z$ is adjusted to give a maximum for the difference $\Delta P$. An examination of the power output vs. frequency curves indicates that there are two regions which are favorable operating points. With reference to FIG. 10, diagram ($a$) represents the power vs. frequency curves discussed earlier. Curve 16 is the unsplit curve, 14 and 18 represent the effect of the magnetic field splitting. The frequency separation of the curves is given by $\Delta\nu_Z$ and is a function of the magnetic field. The splitting of the single mode oscillating at $\nu_C$ is indicated by $\Delta\nu$, with this splitting being approximately $\frac{1}{1000}$ of $\Delta\nu_Z$ as indicated earlier. The sensitivity of the system for the equilibrium point will be related to the slope of the power versus frequency curves which determine the power output of the two modes. The small region of interest is shown in heavier lines in FIG. 10; clearly, a very small magnetic field producing the splitting shown in diagram ($b$) provides less than the sensitivity shown in ($a$), ($e$), or ($d$). The optimum magnetic field can be found by taking the derivative with respect to the Zeeman splitting $\Delta\nu_Z$ of the power difference between the two modes and setting it equal to zero. The situation is complicated by the hole burning phenomenon mentioned earlier. The power output vs. frequency curves for single mode operation have the shape shown in diagram ($e$) of FIG. 10. As power increases the dip at the center, called "Lamb dip" earlier, becomes more pronounced and there are now two slopes of different sign for the power vs. frequency curves. The optimization of the Zeeman splitting now requires also a consideration of the power dependence.

The degree of stabilization which can be achieved by this invention depends ultimately on the signal to noise ratio of the detector-amplifier chain; for operation within the Lamb dip one finds that $$\left(\frac{\Delta P}{P}\right)_{max.} = \frac{1.6}{\Delta \nu_L} d\nu$$

where $$\left(\frac{\Delta P}{P}\right)_{max.}$$

is the optimum relative power change for a detuning $d\nu$ of the laser from line center; $\Delta\nu_L$ is the Lamb dip width at half-height for which 20 mc./sec. is a typical value. If a power change $\Delta P/P$ of one part in $10^5$ can be detected, one finds that the system is sensitive to a detuning of 100 c./sec. or, at 6328 A to a change in frequency of approximately 2 parts in $10^{13}$.

The stabilization invention described so far is applicable to most gas lasers. All that is required is that there be a degeneracy either of the upper or the lower state of the transition.

Modifications of our invention described with particular reference to FIGS. 7 and 9 are susceptible of further modifications; some of these are listed below:

Instead of rotating the polarizer one can rotate the quarter wave plate and keep the polarizer stationary.

Either quarter wave plate or polarizer or both could be electro-optic crystals and the periodic change in axes of one or the other can be obtained by appropriate electrical signals which can conveniently be of the square wave voltage type.

The comparison of left and right circularly polarized components can be accomplished by a periodic change in the direction of the axial magnetic field leaving stationary both quarter wave plate and polarizer.

Electro-optic elements such as quarter wave plates and polarizers can be inside the active cavity instead of outside and/or the functions of both can be combined in a single electro-optic crystal by appropriately synchronized electrical signals.

The mirror spacing adjustment can be performed by a variety of means including an electro-optic crystal inside the laser cavity.

Instead of equalizing the power difference $P_1-P_y$ one could maximize the product $P_1P_2$ (or any convenient functions of the power) to obtain a signal which indicates the equality of the powers in the two polarizations. Signals indicating the direction of the correction can be obtained by comparing independently the magnitude of the two polarizations.

Furthermore, the invention is usable with CW solid lasers as well as gas lasers.

We claim:

1. Laser apparatus, useful with a laser device having first and second end reflectors, for spacing the end reflectors to stabilize the frequencies of oscillation to a known relationship with the center of the atomic transition at which laser action occurs, comprising:
   a magnetic field, into which the laser device is immersed, for splitting the radiated emission from a laser device into right and left circularly polarized light;
   a detector for producing a rectified D.C. voltage proportional to the difference in intensity between said right and left circularly polarized radiation; and,
   means for moving said first reflector in accordance with the voltage output from said detector.

2. Laser apparatus, useful with a laser device having first and second end reflectors, for spacing the end reflectors to stabilize the frequencies of oscillation to a known relationship with the center of the atomic transition at which the laser action occurs, comprising:
   a magnetic field, into which the laser device is immersed, for splitting the radiated emission from a laser device into right and left circularly polarized light;
   means for obtaining the sum of representations of the intensity of said right and left circularly polarized light;
   a detector for producing a rectified D.C. voltage proportional to the difference in intensity between said right and left circularly polarized radiation; and,
   means for moving said first reflector in accordance with the voltage output from said detector.

3. Laser apparatus, useful with a laser device having first and second end reflectors, for spacing the end reflectors to stabilize the frequencies of oscillation to a known relationship with the center of the atomic transition at which the laser action occurs, comprising:
   Zeeman effect means for splitting the radiated emission from said laser device into right and left circularly polarized light;
   a series arrangement of a quart-wave plate, a polarizer, and a photomultiplier for obtaining the sum of representations of the intensity of said right and left circularly polarized light;
   a detector for producing a rectified D.C. voltage proportional to the difference in intensity between said right and left circularly polarized radiation; and,
   a piezoelectric device for moving said first reflector in accordance with a voltage output from said detector.

4. Laser apparatus, useful with a laser device having first and second end reflectors, for spacing the end reflectors to stabilize the frequencies of oscillation to a known relationship with the center of the atomic transition at which the laser action occurs, comprising:
   a magnetic field into which the laser device is immersed for splitting the radiated emission from said laser device into right and left circularly polarized light;
   an electro-optic crystal and photomultiplier for obtaining the sum of representations of the intensity of said right and left circularly polarized light;
   a detector for producing a rectified D.C. voltage proportional to the difference in intensity between said right and left circularly polarized radiation; and,
   means for moving said first reflector in accordance with a voltage output from said detector.

5. Laser apparatus, useful with a laser device having first and second end reflectors, for spacing the end reflectors to stabilize the frequencies of oscillation to a known relationship with the center of the atomic transition at which the laser action occurs, comprising:
   a magnetic field into which the laser device is immersed for splitting the radiated emission from said laser device into right and left circularly polarized light;
   means for obtaining the sum of representations of the intensity of said right and left circularly polarized light;
   a detector for producing a rectified D.C. voltage proportional to the difference in intensity between said right and left circularly polarized radiation; and,
   a piezoelectric device for moving said first reflector in accordance with a voltage output from said detector.

6. Laser apparatus, useful with a laser device having first and second end reflectors, for spacing the end reflectors to stabilize the frequencies of oscillation to a known relationship with the center of the atomic transition at which the laser action occurs, comprising:
   Zeeman effect means for splitting the radiated emission from said laser device into right and left circularly polarized light of different intensities and different frequencies;
   an electro-optic crystal between said end reflectors for obtaining the sum of representations of the intensity of said right and left circularly polarized light;
   a detector for producing a rectified D.C. voltage proportional to the difference in intensity between said right and left circularly polarized radiation; and, means for moving said first reflector in accordance with a voltage output from said detector.

7. A laser apparatus for spacing the end reflectors of a first laser device in order to stabilize the frequencies of oscillation to the center of the atomic transition at which laser action occurs therein, comprising:

a stabilized second laser device having first and second end reflectors, a magnetic field, into which the second laser device is immersed for splitting the radiative emission from the second laser device into right and left circularly polarized light, a detector for producing a rectified D.C. voltage proportional to the difference in intensity between said right and left circularly polarized radiation, and means for moving said first reflector in accordance with the voltage output from said detector;

means for obtaining representations of the frequency of each of said right and left circularly polarized light and the radiation from said first laser; and, means for moving one of the end reflectors of said first laser device in response to such representations.

8. Laser apparatus for spacing the end reflectors of a first laser device in order to stabilize the frequencies of oscillation to the center of the atomic transition at which the laser action occurs therein, comprising:

a stabilized second laser device having first and second end reflectors, a magnetic field, into which the second laser device is immersed for splitting the radiative emission from the second laser device into right and left circularly polarized light, a detector for producing a rectified D.C. voltage proportional to the difference in intensity between said right and left circularly polarized radiation, and means for moving said first reflector in accordance with the voltage output from said detector;

means for producing a rectified D.C. voltage proportional to the difference in frequency between each of said right and left circularly polarized radiation and the radiation from said first laser; and, means for moving one of the end reflectors of said first laser device in accordance with the voltage output from said means for producing.

9. Laser apparatus for spacing the end reflectors of a first laser device in order to stabilize the frequencies of oscillation to the center of the atomic transition at which the laser action occurs therein, comprising:

a stabilized second laser device having first and second end reflectors, a magnetic field, into which the second laser device is immersed for splitting the radiative emission from the second laser device into right and left circularly polarized light, a detector for producing a rectified D.C. voltage proportional to the difference in intensity between said right and left circularly polarized radiation, and means for moving said first reflector in accordance with the voltage output from said detector;

a detector for producing a rectified D.C. voltage proportional to the difference in frequency between each of said right and left circularly polarized radiation and the radiation from said first laser; and, means for moving one of the end reflectors of said first laser device in accordance with the voltage output from said detector.

10. Laser apparatus for spacing the end reflectors of a first laser device in order to stabilize the frequencies of oscillation to the center of the atomic transition at which the laser action occurs therein, comprising:

a stabilized second laser device having first and second end reflectors, a magnetic field, into which the second laser device is immersed for splitting the radiative emission from the second laser device into right and left circularly polarized light, a detector for producing a rectified D.C. voltage proportional to the difference in intensity between said right and left circularly polarized radiation, and means for moving said first reflector in accordance with the voltage output from said detector;

means for obtaining representations of the frequency of said right and left circularly polarized light;

a detector for producing a rectified D.C. voltage proportional to the difference in frequency between each of said right and left circularly polarized radiation and the radiation from said first laser; and means for moving one of said end reflectors of said first laser device in accordance with the voltage output from said detector.

11. Laser apparatus for spacing the end reflectors of a first laser device in order to stabilize the frequencies of oscillation to the center of the atomic transition at which the laser action occurs therein, comprising:

a stabilized second laser device having first and second end reflectors, Zeeman effect means for splitting the radiated emission from said second laser device into right and left circularly polarized light, a detector for producing a rectified D.C. voltage proportional to the difference in intensity between said right and left circularly polarized radiation, and means for moving said first reflector in accordance with the voltage output from said detector;

a series arrangement of a quarter wave plate and a polarizer for obtaining the representations of the frequency of each of said right and left circularly polarized light, a beam splitter and photomultiplier for obtaining a second representation related to the frequency difference between each of said right and left circularly polarized light and the radiation from said first laser;

a detector for producing a D.C. voltage proportional to said differences in frequency; and, a piezoelectric device for moving one of the end reflectors of said first laser device in accordance with said voltage.

References Cited

UNITED STATES PATENTS

| | | | |
|---|---|---|---|
| 3,213,281 | 10/1965 | Nedderman | 331—94.5 |
| 3,361,990 | 1/1968 | Gordon et al. | 331—94.5 |

RONALD I. WIBERT, *Primary Examiner.*

W. L. SIKES, *Assistant Examiner.*